June 3, 1930.  R. D. PIKE  1,761,641
METALLURGICAL PROCESS
Filed Feb. 11, 1926
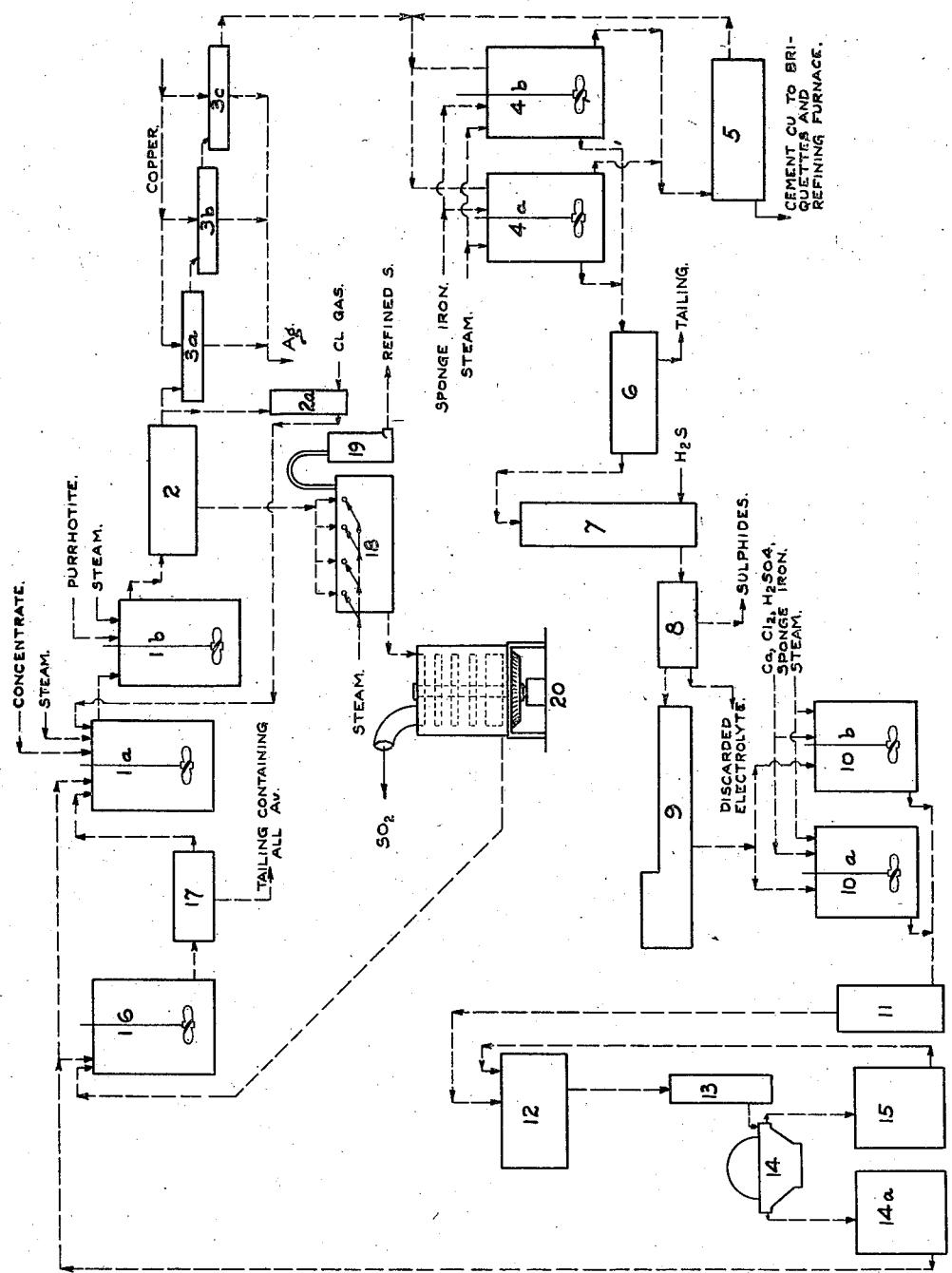
INVENTOR.
Robert D. Pike.
BY
Townsend, Loftus & Abbett
ATTORNEYS.

Patented June 3, 1930

1,761,641

UNITED STATES PATENT OFFICE

ROBERT D. PIKE, OF PIEDMONT, CALIFORNIA

METALLURGICAL PROCESS

Application filed February 11, 1926. Serial No. 87,509.

This invention relates to a cyclic process for the treatment of sulphide ores for the recovery of the metallic content, and more particularly to a process of the nature disclosed in my application Serial Number 58,012, filed September 23, 1925.

The object of the present invention is to make possible the treating of certain classes of relatively clean copper concentrates which may contain appreciable amounts of Ca, Mg, and Al, in such manner that but little discard of the solution becomes necessary in carrying out a cyclic process of the general nature disclosed in the above-mentioned application. A further object is the production of electrolytic iron from sulphide ores.

My present invention provides a practical method of carrying out such a cyclic process with little or no discard of the electrolyte, and replacing unavoidable losses of electrolyte in a cheap and convenient manner, as well as other novel and useful features. The electrolytic iron resulting from this process is of higher purity than has hitherto been produced by a commercial process, having the following analysis:

| | |
|---|---|
| Carbon | .006 or less |
| Sulphur | .007 or less |
| Copper | .006 or less | with an entire absence of phosphorus, silicon, manganese, nickel, cobalt, cadmium, arsenic, lead, tin, and zinc.

In the accompanying drawing I show the application of a preferred form of flow sheet to a copper concentrate of the following approximate analysis:

| | |
|---|---|
| Au | 0.10 oz. per ton |
| Ag | 6.70 oz. per ton |
| Cu | 28.05 per cent |
| Fe | 15.18 per cent |
| S | 16.21 per cent |
| $SiO_2$ | 19.65 per cent |
| $Al_2O_3$ | 7.75 per cent |
| CaO | 2.78 per cent |
| MgO | 2.06 per cent |

This material should be ground so that at least 70% passes through 200 mesh, but the more finely-ground the concentrate the better.

The copper mineral in this concentrate is composed substantially of two-thirds bornite and one-third chalcopyrite.

However, I do not wish to be understood as limiting my invention to the particular case described, because a considerable variation may be permitted in the class of mineral treated as well as in the nature of the solutions employed and the steps followed without departing from the spirit of my invention, which I believe to be broad and basic in its nature in view of the prior known art.

Referring to the flow sheet, $1^a$ is an agitator shown conventionally as a tank with with a propeller. The tank is preferably lined with acid-proof stone ware and the propeller and shaft rubber covered. Into this tank is introduced a continuous stream of leach liquor containing about 10% total iron as chloride, and of this total iron about half or 5% as ferric chloride. A continuous stream of the above-mentioned concentrates is also introduced into tank $1^a$, and live steam is introduced in sufficient amount to maintain the temperature at 100° to 105° centigrade. The relative flow of leach and concentrate is so proportioned that the effluent will contain 1.2% to 1.3% of ferric iron. The size of the tank is so proportioned that the time of residence is about 3 hours. The stream of thin pulp then goes to a similar but smaller agitator $1^b$, where a continuous stream of pyrrhotite is added, so as to reduce the ferric iron to .2%. The tank $1^b$ is so proportioned that the time of residence is one to two hours. My reason for splitting the leaching operation into two stages employing pyrrhotite in the second stage is that by this means I effect a higher extraction of copper from the concentrates than if the latter were depended upon to complete the reduction of the solution. I find that for each pound of concentrate about .2 pound of pyrrhotite is required—varying somewhat with variations in the grade of both concentrate and pyrrhotite.

The effluent from the tank $1^b$ passes to filter press 2. The effluent from the filter press 2 contains in solution about 90% of the copper and 90% of the silver in the original minerals, as well as about 65% of the iron. I may now introduce chlorine to make up for unavoidable losses usually amounting to about .1 to .3 pound Cl per pound of electrolytic iron produced in a later stage of the process by diverting the necessary portion of the effluent from the filter press 2 and treating with gaseous chlorine in a suitable apparatus $2^a$. The amount of electrolyte so diverted is proportioned so that when the required amount of chlorine has been introduced the resulting liquor will contain about 5% of ferric chloride. The chlorinated liquor then goes back to $1^a$. Make up chlorine can be added by introducing same into the leach tank $1^a$, but if this is done some of the chlorine will be employed in oxidizing sulphur to sulphate. The balance or major part of the liquor from the filter press 2 continues on through suitable apparatus conventionally shown as treating vessels $3^a$, $3^b$, $3^c$, for precipitation of silver. This can be accomplished by precipitating silver on copper in any well-known manner.

The liquor, after silver precipitation, passes to suitable receptacles $4^a$, $4^b$, for precipitation of copper on iron. The method illustrated is as follows: Tank $4^a$ is filled with solution heated to 70° to 80° centigrade and slightly acidulated with $H_2SO_4$ to pH about 2.5 and the requisite amount of sponge iron added to effect complete precipitation of the copper. The copper is then allowed to settle, and the clear liquor decanted off. The cement copper is passed through a filter 5 and the effluent returned to either receptacle $4^a$ or $4^b$ because it may contain traces of redissolved copper. The main flow of liquor passes through a clarifying press 6 and then through a gas-treating tower 7 where it is treated with $H_2S$ to precipitate traces of Zn and possibly other impurities. With regard to Zn, I find it desirable to limit the content of this metal to 1% or less in the ores and concentrates received by the plant; but I have discovered that as much as .1% Zn remaining in the solution after the treatment with $H_2S$ results in practically no contamination of the iron with Zn. The liquor then passes through filter 8, where any sulphides which were formed in gas-treating tower 7 are filtered out. The purified liquor then passes through an evaporator 9 of suitable design to restore the specific gravity of the liquor to about 1.3 to 1.35. The effluent of concentrated liquor from the evaporator then passes to correction tanks $10^a$ and $10^b$. An accurate determination of copper is made at this point, and if any analytical trace is found above .01%, a small amount of sponge iron is added after correcting the acidity to pH=2.5 by addition of $H_2SO_4$ and the temperature of the solution being maintained at 70° to 80° centigrade the last trace of copper is precipitated. At this point it will usually be necessary to add some $CaCl_2$ to keep the $SO_4$ content of the solution at the equilibrium point represented by the solubility of $CaSO_4$ in these solutions. I have found such equilibrium point to be about .15% of $SO_4$. The addition of $CaCl_2$ in this manner precipitates artificial gypsum and puts chlorine into the solution, and by properly controlling the addition of $SO_4$ as described hereafter, all of the chlorine losses can be made up in this manner by addition of $CaCl_2$ if desired; and if this practice is followed, obviously it will be unnecessary to add chlorine gas as above described. The choice between calcium chloride and chlorine gas for making up chlorine losses rests to some extent on economic grounds; but I have found that the voluminous precipitation of calcium sulphate (gypsum), which is formed when all of the chlorine loss is made up by the addition of calcium chloride, is very useful in the precipitation of traces of colloidal carbon and sulphur from solution, and consequently in producing an electrolytic iron in the subsequent step of the process which is exceptionally free from these impurities.

The liquor which leaves tanks $10^a$ and $10^b$ is completely purified, and has only to be passed through a filter 11 before going to a tank 12 which is the electrolyte storage for the electrolytic iron department. The electrolyte then passes through heater 13 and goes to electrolytic iron cell 14. This is of the diaphragm type with insoluble graphite anodes. A portion of the catholyte goes to the sump 15 and is circulated back to the tank 12. The return circulation of catholyte from the electrolytic iron cells contains small amounts of basic salts of iron in suspension and these are filtered out by providing tank 12 with a sand filter false bottom, not shown, or by other suitable means, thus insuring a feed of clear electrolyte to the cells. The anolyte leach goes to the sump $14^a$.

Returning now to a consideration of the tails from the filter 2. These contain about 20% of free distillable sulphur and about 40% of insoluble matter. I have found that a very clean separation can be made between the minerals and sulphur on one hand and the insoluble matter on the other hand, by flotation if desired, in a suitable flotation apparatus, not shown. It will usually be considered justifiable to carry out such flotation on economic grounds. Whether flotation be employed or not, the solids may next be treated for recovery of refined sulphur by distillation in retorts 18, the sulphur being condensed in 19. Steam may be employed, if desired, to assist distillation. The distillation of sulphur may be omitted entirely if desired. The solids, either direct from filter press 2 or after flotation, or distillation, or both, go next to a multiple hearth roaster 20. Here the roasting may be so conducted by well-known means as to produce just the proper amount of $SO_4$ which may be desired to precipitate $CaCl_2$ in the correction tanks $10^a$ and $10^b$. If chlorine losses are being made up from gaseous chlorine, then no $SO_4$ should be produced in this step, and all copper should be roasted to oxide. A small amount of $SO_4$ is always inadvertently formed in leaching tanks $1^a$ and $1^b$, and this will usually require the addition of a small amount of $CaCl_2$ in tanks $10^a$ and $10^b$, although lime occurring naturally in the concentrates will act to precipitate $SO_4$.

An important discovery in connection with this invention is that soluble Mg and Al, Na and K which would ordinarily go into solution as chlorides form insoluble basic salts, and the precipitation of these base salts, together with precipitation of lime, prevents the building up of these impurities in the solution without its being necessary to make a systematic discard. I have found that, after running my process for over 40 complete closed cycles and in spite of the fact that a considerable part of the Ca, Mg, and Al in the concentrates and pyrrhotite is soluble in ferric chloride leaches, the concentration of Mg is less than .1%, and of Al less than .01%, Na .1%, K .1%, and the Ca maintains its expected concentration based upon the gypsum solubility, namely .3% to .5%. An additional source of $SO_4$ ion to those mentioned is found in the manufacture of the $H_2S$ which, as above stated, is used in purifying the solution, and particularly for the removal of Zn. This $H_2S$ can be made by treating pyrrhotite (FeS) with $H_2SO_4$ in suitable apparatus, not shown, and the resulting $FeSO_4$ solution can be added to the main flow of liquor just prior to its entering the evaporator. I have found that, considering the $SO_4$ which it is possible to produce by roasting the Cu remaining after the first or chloride leach to $CuSO_4$, the $SO_4$ which is made by spontaneous oxidation of sulphur in the first or chloride leach, and that which may be recovered as a by-product from the manufacture of $H_2S$, I can provide all make up chlorine from $CaCl_2$ added in the correction tanks, as above described, to the extent of .1 pound to .3 pound per pound of electrolytic iron, which will usually be more than enough to cover actual losses in the operation of the cycle. Also in adding this amount of $CaCl_2$ a free filtering but very voluminous precipitate of artificial gypsum which is a highly efficient cleaner for removing impurities from solution by absorption and adsorption, is formed. This reaction may be closely compared to the cleansing action of precipitated $CaCO_3$ in purifying beet sugar juices.

I have further found that after roasting the remaining copper content of the solids, corresponding to about 10% of the total copper, is almost completely soluble in the anolyte leach. I therefore treat the cinders in a suitable digester 16, with a portion of the anolyte leach from the cells. The pulp is filtered in 17, the effluent joining the stream of remaining anolyte leach and going to the tank $1^a$. The tails from the filter 17 contain practically all of the gold occurring in the concentrates and pyrrhotite, and this may be recovered, if desired, by any suitable known means.

The iron produced by this process is of extreme and novel purity. The sum of the impurities C, S, P, Si, and Mn, is less than .015%, and this result makes available for commercial use a purer form of iron than has hitherto been available. Iron of this unique purity has great value in the manufacture of electromagnetic alloys of types which are useful in the electrical industry.

An alternative method of effecting a high extraction of the metals, which is useful when a high iron extraction is the principal end sought, is based upon my discovery that, if I take the solid residues after the distillation of same for the recovery of sulphur, a certain further extraction of metal will result if this residue be again treated with fresh anolyte leach and without roasting. This further extraction is also assisted by regrinding with or without distillation of sulphur. It is usually more advantageous to roast as described when treating copper concentrates; but if pyrrhotite, for example, carrying say 1.5 to 2% Cu is the ore being treated and the main product is electrolytic iron with Cu as a by-product of secondary importance, then the roasting step is not necessary. This is true because a 90% recovery of the Cu, which is readily obtained, is satisfactory in such a case, and the roasting does not result in recovery of any more iron. Any iron which is to be recovered from the pyrrhotite and produced as electrolytic iron must be dissolved from the pyrrhotite as such without roasting, because iron oxide is not soluble in ferric chloride.

If pyrrhotite is the raw material employed and the roasting step is eliminated, as indicated, some other means has to be employed for supplying $SO_4$ to the cycle. Additional amounts of $SO_4$ can be formed by blowing air through the leaching tank $1^a$. However, the roasting step will usually be the most suitable method for adding $SO_4$ to the cycle, and in carrying out such a step it is not necessary to employ tails from the first chloride leach, either before or after recovery of their sulphur by distillation, but other ores or concentrates can be employed, in whole or in part, such, for example, as copper concentrates. If the residue from the leach in $1^a$ is first treated for distillation of S and then reground, a dry grinding unit (not shown)

is employed, and the reground tails are again treated with strong leach, the filtrate going to 1ᵃ, and the tails being reserved for recovery of precious metals, if desired.

Having thus described my invention, what I claim as new and desire to secure by Letters Patent is:

1. A cyclic process for treating sulphide ores for recovery of their metallic content which consists in leaching with a hot solution containing ferric chloride, precipitating from said solution substantially all metals except iron, adding calcium chloride to the solution, electrodepositing iron and regenerating the ferric chloride leach, roasting the tails from the leaching operations, leaching the cinders from the roast with all or a portion of the regenerated ferric leach before said leach is returned to the first-mentioned leaching operation, and so controlling the oxidation of sulphur to sulphate in the cycle that sufficient of the latter ion will be formed to precipitate impurities which form relatively insoluble sulphate compounds.

2. A cyclic process for treating sulphide ores for recovery of their metallic content and sulphur, which consists in leaching with a hot solution containing ferric chloride, precipitating from said solution substantially all metals except iron, adding calcium chloride to the solution, electrodepositing iron and regenerating the ferric chloride leach, distilling sulphur from the tails from the leaching operations, roasting the residue after distillation, leaching the cinders from the roast with all or a portion of the regenerated ferric leach before said leach is returned to the first-mentioned leaching operation, and so controlling the oxidation of sulphur to sulphate in the cycle that sufficient of the latter ion will be formed to precipitate impurities which form relatively insoluble sulphate compounds.

3. A cyclic process for treating sulphide ores for recovery of their metallic content and sulphur, which consists in leaching with a hot solution containing ferric chloride, precipitating from said solution substantially all metals except iron, adding calcium chloride to the solution, correcting acidity to the optimum point for electro-deposition of iron, electrodepositing iron and regenerating the ferric chloride leach, subjecting the tails from the leach to flotation to concentrate their metallic content, roasting the concentrates, leaching the cinders from the roast with all or a portion of the regenerated ferric leach before said leach is returned to the first-mentioned leaching operation, and so controlling the oxidation of sulphur to sulphate in the cycle that sufficient of the latter ion will be formed to precipitate impurities which form relatively insoluble sulphate compounds.

4. A cyclic process for treating sulphide ores for recovery of their metallic content which consists in leaching with a hot solution containing ferric chloride, diverting a portion of solution after said leach, adding chlorine gas and returning the chlorinated liquor to the leach, precipitating from the net advance of solution substantially all metals except iron, electrodepositing iron and regenerating the ferric chloride leach, roasting the tails from the mentioned leaching operation, leaching the cinders from the roast with all or a portion of the regenerated ferric leach before said leach is returned to the first-mentioned leaching operation, and so controlling the oxidation of sulphur to sulphate in the cycle that sufficient of the latter ion will be formed to precipitate impurities which form relatively insoluble sulphate compounds.

5. A cyclic process for treating sulphide ores for recovery of their metallic content which consists in leaching with a hot solution containing ferric chloride, diverting a portion of solution after said leach, adding chlorine gas and returning the chlorinated liquor to the leach, precipitating from the net advance of solution substantially all metals except iron, electrodepositing iron and regenerating the ferric chloride leach, roasting the tails from the mentioned leaching operation, leaching the cinders from the roast with all or a portion of the regenerated ferric leach before said leach is returned to the first-mentioned leaching operation, and so controlling the oxidation of sulphur to sulphate in the cycle that sufficient of the latter ion will be formed to precipitate impurities which form relatively insoluble sulphate compounds, and adding calcium chloride to prevent accumulation of sulphate ion.

6. The steps in a process for treating sulphide ores for recovery of their metallic content which consists in leaching the ore with a leach containing ferric chloride, roasting the tail, and then further leaching the cinders with ferric chloride leach for increasing the extraction of copper and other metals.

7. The steps in a cyclic process for treating sulphide ores for recovery of their metallic content which consist in leaching the ore with a leach containing ferric iron and substantially no added acid, roasting the tails, and then further treating the cinders with substantially the same leach liquor as employed in the first-mentioned leach for increasing the extraction of copper and other metals.

8. The steps in a cyclic process for treating sulphide ores for recovery of their metallic content which consist in forming within the cycle sufficient sulphate ion to precipitate all impurities which form insoluble compounds with the sulphate ion.

9. The steps in a cyclic process for treating sulphide ores for recovery of their metallic content which consists in forming within the cycle sufficient sulphate ion to precipitate all impurities which form insoluble compounds with the sulphate ion, and preventing the accumulation of sulphate ion by addition of calcium chloride.

10. The step in a cyclic process for treating sulphide ores for recovery of their metallic content which consists in making up losses of chlorine from the electrolyte by adding calcium chloride to the electrolyte and precipitating the calcium by sulphate ion.

11. The step in a cyclic process for treating sulphide ores for recovery of their metallic content which consists in maintaining sulphate ion in the electrolyte at a predetermined concentration by precipitating all in excess of the said concentration as calcium sulphate by adding calcium chloride to the electrolyte.

12. The step in a cyclic process for treating sulphide ores for recovery of their metallic content for replacing chlorine losses in the electrolyte, which consists in withdrawing a portion of the electrolyte, treating the same with chlorine gas, and returning the chlorinated liquor to the leaching step of the cycle.

13. The step in a cyclic process for treating sulphide ores for recovery of their metallic content including electrolytic iron which consists of removing colloidal carbon and sulphur from solution by causing to form in said solution a voluminous precipitate of artificial gypsum, by interaction of added calcium chloride with surplus sulphate ions in the solution.

14. The steps in a cyclic process for treating sulphide ores for the recovery of electrolytic iron, other metals, and sulphur, which consist in subjecting the ore to the action of a solution containing ferric iron, filtering, subjecting the residue to distillation for recovery of elemental sulphur, and again leaching the residue for the further solution of metals with a leach containing ferric iron.

15. The steps in a cyclic process for treating sulphide ores for the recovery of electrolytic iron, other metals, and sulphur, which consist in subjecting the ore to the action of a solution containing ferric iron, filtering, subjecting the residue to distillation for recovery of elemental sulphur, regrinding the residue after distillation, and again leaching the reground residue with a leach containing ferric iron for the further solution of metals.

16. In a cyclic process for treating sulphide ore for the recovery of electrolytic iron and other metals, the steps of making up chlorine losses by the reaction of $CaCl_2$ with $SO_4$ ion in the electrolyte, and controlling the amount of $SO_4$ ion formed in the leaching step with ferric chloride leach by introducing a regulated amount of air to the pulp during leaching.

17. A cyclic process for treating sulphide ores for recovery of electrolyic iron, which consists in leaching with a hot solution containing ferric chloride, electro-depositing iron, and regenerating the ferric leach, and adding sulphate iron to the cycle in an amount sufficient to maintain a concentration of less than .3%.

18. A cyclic process for treating sulphide ores for recovery of electrolytic iron, which consists in leaching with a hot solution containing ferric chloride, electro-depositing iron and regenerating the chloride leach and adding sulphate ion to replace that precipitated as insoluble sulphates in the cycle.

19. A cyclic process for treating sulphide ores for recovery of electrolytic iron, which consists in leaching with a hot solution containing ferric chloride, adding calcium chloride to make up chlorine losses, electro-depositing iron and regenerating the chloride leach, and adding sulphate ion to replace that precipitated as insoluble sulphates in the cycle.

20. A cyclic process for treating sulphate ores for the recovery of electrolytic iron, which consists in leaching with a hot solution containing ferric chloride, adding gaseous chlorine to the liquor in an amount sufficient to make up chlorine losses in the cycle, electro-depositing iron and regenerating the chloride leach and maintaining the concentration of sulphate ion at a substantially constant level by forming insoluble sulphate precipitates with the surplus.

ROBERT D. PIKE.